United States Patent
Neeli et al.

(10) Patent No.: US 11,882,467 B2
(45) Date of Patent: Jan. 23, 2024

(54) ARTIFICIALLY INTELLIGENT WLAN UPLINK MONITORING FOR STEERING WIRELESS STATIONS TO SELECTIVE ACCESS POINTS ON WIRELESS DATA COMMUNICATION NETWORKS

(71) Applicant: Fortinet, Inc., Sunnyvale, CA (US)

(72) Inventors: Srinivasa Subbarao Neeli, Bangalore (IN); Sudheer Nagurla, Bangalore (IN)

(73) Assignee: Fortinet, Inc., Sunnyvale, CA (US)

( * ) Notice: Subject to any disclaimer, the term of this patent is extended or adjusted under 35 U.S.C. 154(b) by 410 days.

(21) Appl. No.: 17/217,177

(22) Filed: Mar. 30, 2021

(65) Prior Publication Data

US 2021/0289375 A1    Sep. 16, 2021

Related U.S. Application Data

(63) Continuation-in-part of application No. 17/060,069, filed on Sep. 30, 2020, now Pat. No. 11,540,142, and a continuation-in-part of application No. 16/724,334, filed on Dec. 22, 2019, now Pat. No. 11,057,304.

(51) Int. Cl.
| | |
|---|---|
| *H04W 24/08* | (2009.01) |
| *G06N 5/02* | (2023.01) |
| *H04L 12/26* | (2006.01) |
| *H04L 43/12* | (2022.01) |
| *H04L 43/0805* | (2022.01) |
| *H04L 43/16* | (2022.01) |
| *H04W 88/08* | (2009.01) |
| *H04W 84/12* | (2009.01) |

(52) U.S. Cl.
CPC .............. *H04W 24/08* (2013.01); *G06N 5/02* (2013.01); *H04L 43/0805* (2013.01); *H04L 43/12* (2013.01); *H04L 43/16* (2013.01); *H04W 84/12* (2013.01); *H04W 88/08* (2013.01)

(58) Field of Classification Search
CPC . H04W 40/22; H04W 40/12; H04W 28/0236; H04W 24/08; H04W 48/20; H04W 88/08; H04W 84/12; H04L 43/0805; H04L 41/0853; H04L 47/726; H04L 41/16; H04L 43/12; H04L 43/16; H04L 61/4511; H04L 43/0876; H04L 43/50; G06N 5/02; G06N 5/04

See application file for complete search history.

(56) References Cited

U.S. PATENT DOCUMENTS

| | | |
|---|---|---|
| 9,288,844 B1 | 3/2016 | Akhavan-saraf et al. |
| 10,812,992 B1 | 10/2020 | Tran et al. |
| 11,374,876 B2 | 6/2022 | Joseph et al. |
| 2008/0102845 A1 | 5/2008 | Zhao |
| 2016/0014679 A1* | 1/2016 | Taneja ............... H04W 4/70 455/434 |
| 2016/0302136 A1* | 10/2016 | Bergström ............ H04W 48/16 |
| 2017/0041859 A1* | 2/2017 | Martin ................. H04W 48/16 |
| 2017/0127306 A1* | 5/2017 | Tan Bergström ..... H04W 24/10 |

(Continued)

*Primary Examiner* — Brian D Nguyen
(74) *Attorney, Agent, or Firm* — Law Office of Dorian Cartwright; Dorian Cartwright

(57) ABSTRACT

Specific clients are assigned to a second access point based balancing an Ethernet uplink load status of the specific access point relative to the uplink load status of access points across a WLAN system, wherein the RSSI strength of the specific client relative to a first access point is higher than the RSSI strength of the specific client relative to the second access point.

13 Claims, 6 Drawing Sheets

(56) References Cited

U.S. PATENT DOCUMENTS

| | | |
|---|---|---|
| 2018/0267832 A1 | 9/2018 | Biener et al. |
| 2019/0081958 A1 | 3/2019 | Lee |
| 2019/0320069 A1 | 10/2019 | Ku |
| 2020/0007457 A1 | 1/2020 | Greenstein |
| 2020/0110761 A1 | 4/2020 | Cooper et al. |
| 2020/0236219 A1 | 7/2020 | Ku |
| 2020/0236616 A1* | 7/2020 | Tan Bergstrom ............................ H04W 72/1263 |
| 2020/0274848 A1 | 8/2020 | Sundararajan |
| 2020/0364510 A1 | 11/2020 | Castinado et al. |
| 2021/0067446 A1 | 3/2021 | Ignatchenko |
| 2021/0067455 A1 | 3/2021 | Lahtiranta |
| 2021/0092005 A1 | 3/2021 | Kaul |
| 2022/0256363 A1* | 8/2022 | Sun ................... H04W 28/0933 |

\* cited by examiner

US 11,882,467 B2

ARTIFICIALLY INTELLIGENT WLAN UPLINK MONITORING FOR STEERING WIRELESS STATIONS TO SELECTIVE ACCESS POINTS ON WIRELESS DATA COMMUNICATION NETWORKS

RELATED APPLICATIONS

This application is a continuation-in-part of U.S. application Ser. No. 16/724,334, filed on Dec. 22, 2019, and is a continuation-in-part of U.S. application Ser. No. 17/060,069, filed on Sep. 30, 2020, the contents of both being hereby incorporated herein their entirety.

FIELD OF THE INVENTION

The invention relates generally to computer networking, and more specifically, to using artificial intelligence for driving wireless IEEE 802.11AX stations with 6 GHz uplink capability on wireless data communication networks to best available access points based on real-time uplink capability and performance.

BACKGROUND

Virtual reality, augmented reality, 4k video, gaming and other data network supported applications work best with multi-gigabit wireless network support.

The latest WLAN (wireless local access network) standard promulgated by the Institute for Electronic and Electrical Engineers, Wi-Fi 6E, operates on the 6 GHz band as well as the 5 GHz band but offers additional non-overlapping channels. This is an improvement to IEEE 802.11AX (also known as Wi-Fi 6E and HEW, High-Efficiency Wireless), which provides 160 MHz channel bandwidth for high throughput wireless stations using 1024 QAM (quadrature amplitude modulation) enabled transmissions, with low latency in dense environments. But 5 GHz only two operational channels are available with 160 MHz bandwidth capacity, channels 36 through 64 and channels 100 through 128. Under 36/160 MHz bandwidth, channels 52 to 64 (i.e., 5250 MHz to 5330 MHz), and under 100/160 MHz (i.e., 5490 MHz to 5730 MHz) are all DFS enabled.

While devices with 6 GHz uplink capability are backwards compatible to 5 GHz networks, the opposite is not true, as devices with 5 GHz uplink capability can only operate in the 5 GHz spectrum due to older hardware. Problematically, 6 GHz devices often get stuck on access points operating in 5 GHz mode to serve 5 GHz devices as the lowest common denominator. Current Wi-Fi technology provides no logic or intelligence for providing stations with maximum available uplink capacity.

Wireless stations which are capable of Wi-Fi 6E and Wi-Fi 6 (802.11AX) will transmit their communications with higher data rates access points. As by standard access point does packet conversion of its wireless stations from 802.11 to 802.3, to transmit over the Ethernet backhaul to the respective destinations. Hence access point Ethernet load will be increased while processing these high data rate capable clients 802.11 to 802.3 conversion operation. Hence to support these high end wireless station transmissions, access point Ethernet capacity and its real time usage also matters.

Therefore, what is needed is a robust and intelligent monitoring technique is needed which will monitor the access point uplink Ethernet capacity and real-time bandwidth usage, so that high-efficient wireless stations like Wi-Fi 6E and Wi-Fi 6 clients can be assigned to an access point which has low uplink Ethernet load. Advantageously, latest standard like Wi-Fi 6E and Wi-Fi 6 capable networks can be achieved.

SUMMARY

These shortcomings are addressed by the present disclosure of methods, computer program products, and systems for using artificial intelligence to drive stations with 6 GHz and IEEE 802.11AX uplink capability based on an Ethernet uplink load status across access points of a wireless network.

In one embodiment, a probe to a specific access point of the plurality of access points is detected from a specific station requesting access to the data communication network over the Wi-Fi network. One or more capabilities of the specific station is identified, wherein the specific station has an uplink capability of 6 GHz and IEEE 802.11AX. An Ethernet uplink load status of the WLAN system from a monitoring module to an assignment module is fetched. The Ethernet uplink load status comprises uplink an Ethernet uplink load value for each of the plurality of access points. An RSSI strength of the specific station is identified relative to the specific access point and a second access point of the plurality of access points.

In another embodiment, the specific client is assigned to the second access point based balancing an Ethernet uplink load status of the specific access point relative to the uplink load status of the WLAN system, wherein the RSSI strength of the specific client relative to the specific access point is higher than the RSSI strength of the specific client relative to the second access point.

Advantageously, network performance is improved with higher uplink connections for stations. Additionally, performance for 6 GHz capable devices is also improved.

BRIEF DESCRIPTION OF THE DRAWINGS

In the following drawings, like reference numbers are used to refer to like elements. Although the following figures depict various examples of the invention, the invention is not limited to the examples depicted in the figures.

DETAILED DESCRIPTION

The description below provides methods, computer program products, and systems for using artificial intelligence for using artificial intelligence for dynamically steering stations with 6 GHz spectrum capability, based on spectrum availability and spectrum capability. One of ordinary skill in the art will recognize many additional variations made possible by the succinct description of techniques below. For example, although Wi-Fi referred to throughout this document, the same principles can be extended to Bluetooth or hybrid wireless data communication channels.

I. Systems for Artificially Intelligent Uplink Selection (FIG. 1-2)

Figure 1A:
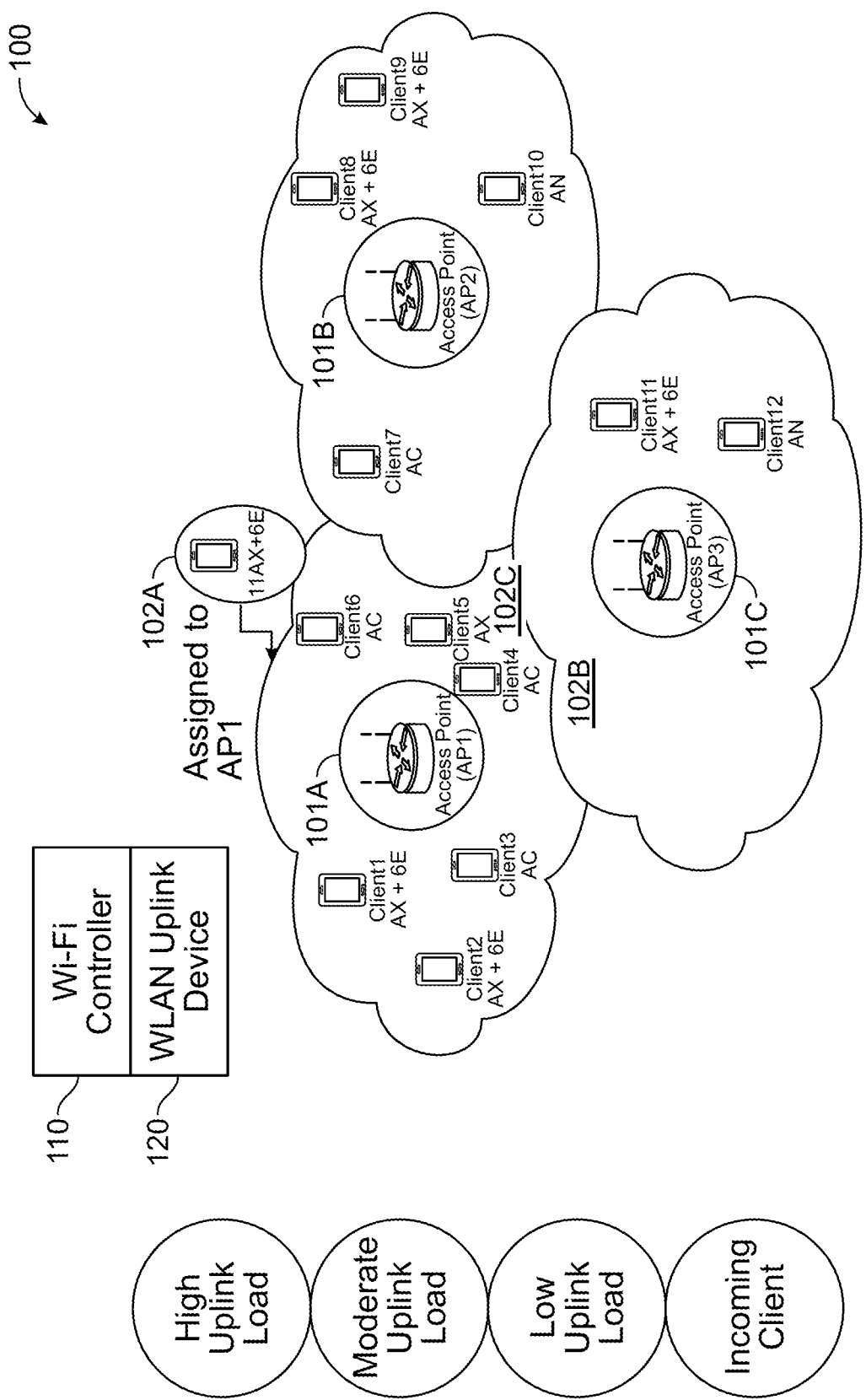
FIGS. 1A/1B are high-level block diagrams illustrating a system for using artificial intelligence to drive stations with 6 GHz uplink capability based on an Ethernet uplink load status across access points of a wireless network, over different snapshots in time, according to one embodiment.
Figure 2:
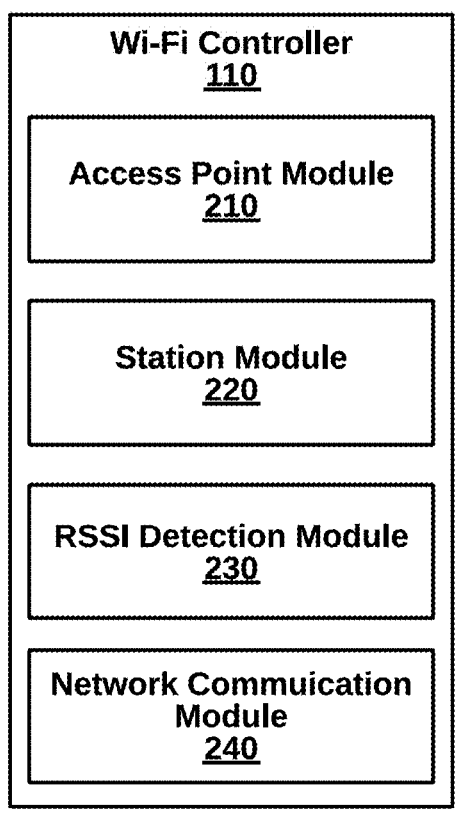
FIG. 2 is a more detailed block diagram illustrating a Wi-Fi controller of the system of FIGS. 1A/1B, according to an embodiment.

FIGS. 1A/1B are high-level block diagrams illustrating a system 100 for using artificial intelligence to drive stations with 6 GHz uplink capability based on an Ethernet uplink load status across access points of a wireless network, according to one embodiment. The system 100 includes a Wi-Fi controller 110, an access point uplink monitoring device 120, access points 101A-C, and stations 102A-C (and others), coupled through a wide area network. Many other embodiments are possible, for example, with more or fewer access points, more or fewer stations, and additional components, such as firewalls, routers and switches. Hardware and software components can be implemented similar to the example of FIG. 6.

The wide area network links components of the system 100 with a channel for data communication. The Wi-Fi controller 110, the WLAN uplink device 120, and the access points 101A-C are preferably connected to the wide area network via hardwire. The stations 102A-C (and others) are wirelessly connected to the access points 101A-D to access the wide area network indirectly. The wide area network can be a data communication network such as the Internet, a WAN, a LAN, WLAN, can be a cellular network (e.g., 3G, 4G, 5G or 6G), or a hybrid of different types of networks. Thus, the system 100 components can be located locally on a LAN or include remote cloud-based devices.

The Wi-Fi controller 110 manages communications and directions to access points, in support of uplink bandwidth management. For example, station assignments can be transmitted to access points by the Wi-Fi controller 110. Uplink statistics, RSSI measurements, and current uplink loads may be sent to the Wi-Fi controller 110 periodically so that when assignments are analyzed, the information is already on hand for other management tasks. In other operations, the Wi-Fi controller 110 connects access points when the join the network and tracks particular stations as they roam between different access points or connect at different times. User accounts can also be maintained across the network and different devices, with respect permissions and privileges. Additional details for the Wi-Fi controller 110 are discussed below in association with FIG. 2.

Figure 1B:
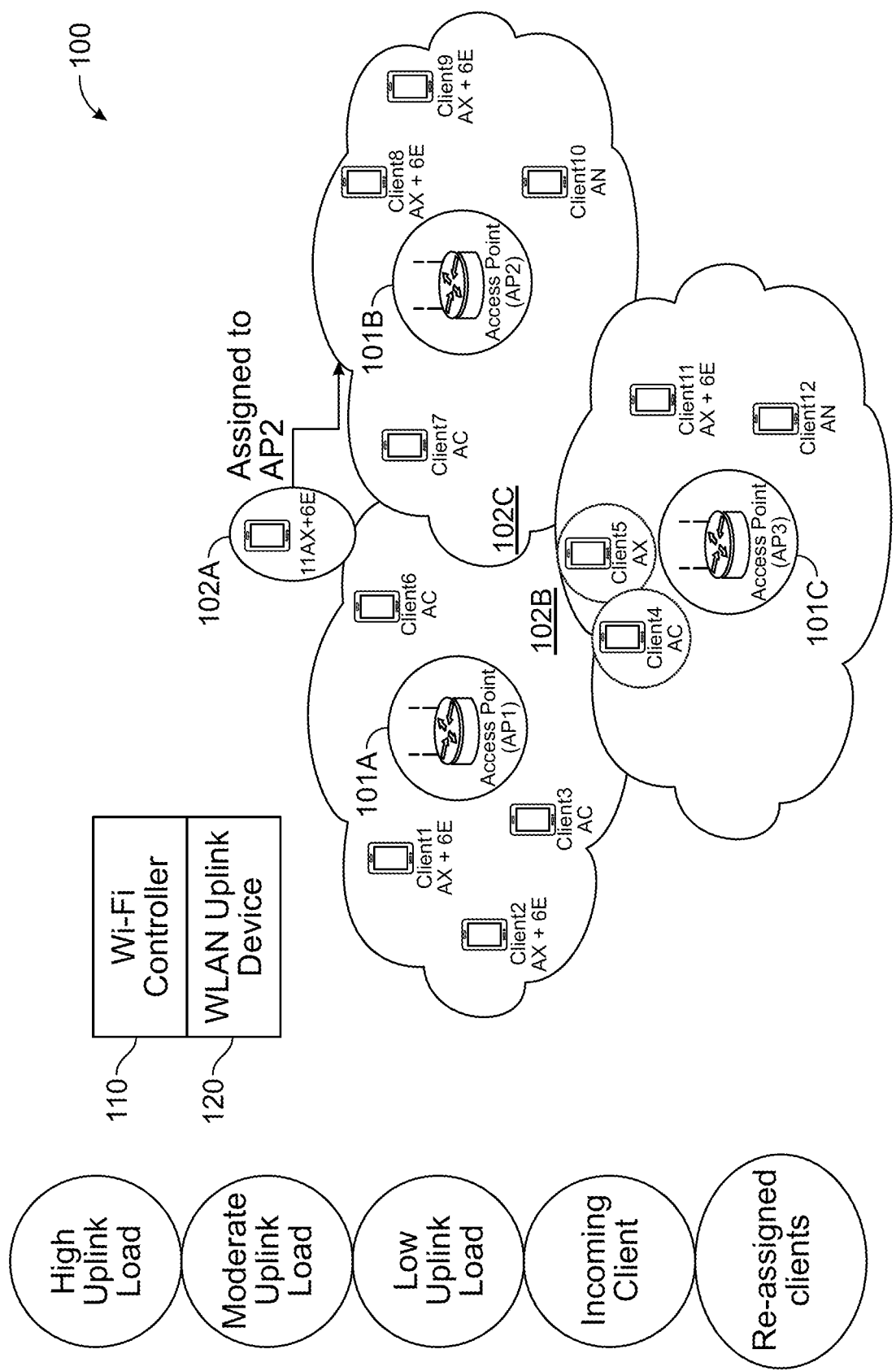

The WLAN uplink device 120, in an embodiment, distributes stations 102A-C among access points 101A-C with logic taking station uplink capabilities and access point loads into consideration (e.g., see FIG. 1B). In another embodiment, downgraded 6 GHz stations are operating on a first access point due to high uplink loads, so the WLAN uplink device 120 steers the downgraded 6 GHz station to a second access point that has a lower uplink load and the station capabilities are no longer downgraded, potentially allowing others stations to be upgraded in uplink bandwidth at the same access point. In yet another embodiment, a change in uplink bandwidth availability is detected by the Ethernet uplink load monitoring device 120 through information shared with the Wi-Fi controller 110. As shown in FIGS. 1A and 1B in succession, stations can be rearranged to different access points based on the uplink capabilities of the stations and access point loads. In one embodiment, the Ethernet uplink load monitoring device 120 updates in status for the downgraded 6 GHz devices and empty 6 GHz access point, to detect available uplink bandwidth. In another embodiment, a second access point can use this information during channel selection.

The access points 101A-C provide channels of download and upload bandwidths for stations to join for access to the Internet, per assignments. For instance, 160 MHz bandwidth channels can operate under IEEE 802.11, or more specifically IEEE 802.11AX (or Wi-Fi 6), over allowed frequencies. The access points 101A-C can also have combinations of 80 MHz, 40 MHz and 20 MHz bandwidth channels available for stations. Two 80 MHz channels can be combined to provide a 160 MHz channel, albeit with additional overhead and processor hardware. In one example, the access points 101A-D are hardware built for beamforming for bi-directional MU-MIMO (multiple-user, multiple input, multiple output) with multiple antennae in, for example, 2×2, 3×3, 4×4 or 8×8 stream variations. Different modulation schemes can be implemented, such as QAM and OFDMA (orthogonal frequency division multiple access). Access points of an implementation downgrade stations from 6 GHz to 5 GHz, or 5 GHz to 2.4 GHz, as necessary to prevent congestion. Additional airtime fairness techniques can be implemented by access points in combination with the presently implemented WLKAN uplink device 120 steering techniques. Access points can measure the signal strength and flight time from various stations based on data packets received from those stations. Local network statistics can be collected and sent upstream from system-wide monitoring.

The stations 102A-C are preferably enabled for 6 GHz uplink spectrums (e.g., Wi-Fi 6 or 802.11ax, and Wi-Fi 6E) with an appropriate Wi-Fi processor and are able to downgrade when the maximum uplink bandwidth is not available. As such, devices The stations 102A-C can be enabled for 160 MHZ, 80 MHz, 40 MHz or 20 MHz channel bandwidths. In one example, the stations 102A-D include MU-MIMO capable for dense environments. Transceivers of the stations 102A-C send a probe request to join a Wi-Fi network and receive available SSIDs. The stations 102A-C can be unaware of transparent reconfigurations upstream on the network, as to which access point is servicing a particular station. Any designated access point within range can respond to a particular stations and other access points can ignore the particular stations (e.g., by MAC address).

Figure 6:
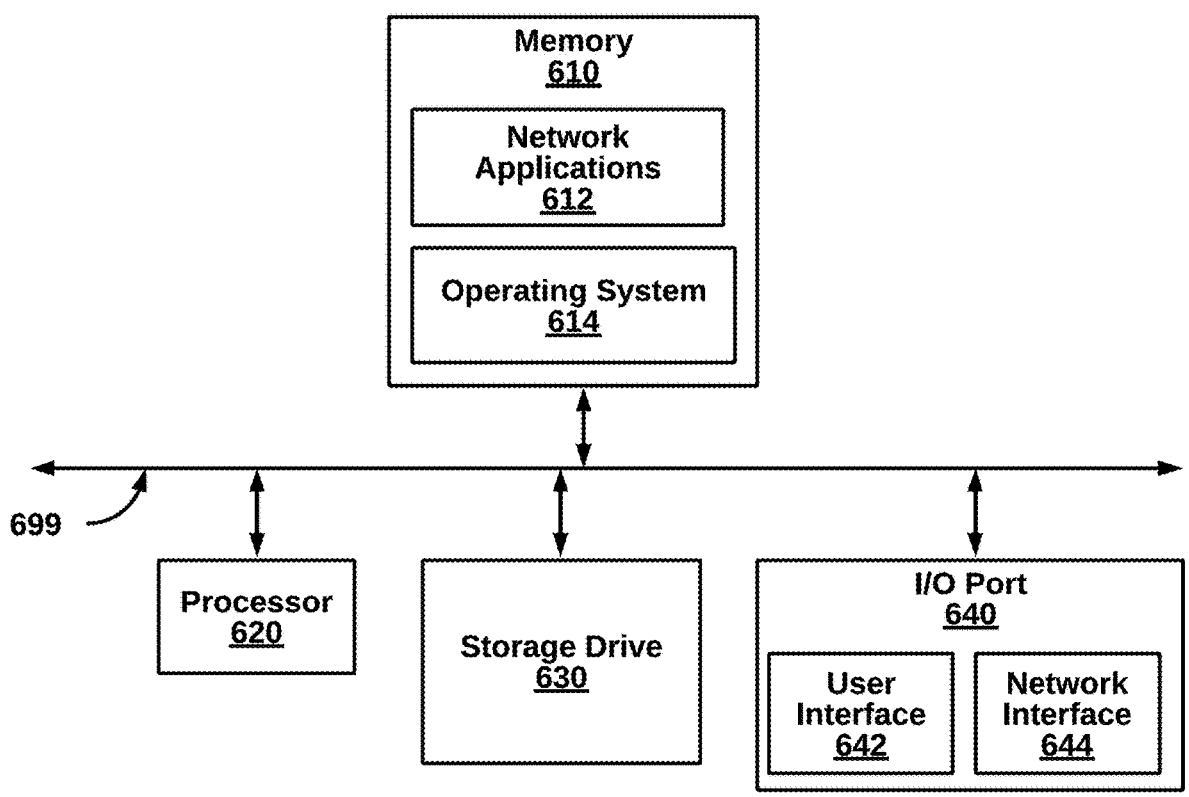
FIG. 6 is a block diagram illustrating an example computing device for supporting uplink techniques, according to one embodiment.

The network components of the system 100 can implemented in any of the computing devices discussed herein, for example, a personal computer, a laptop computer, a tablet computer, a smart phone, a smart watch, a mobile computing device, a server, a cloud-based device, a virtual device, an Internet appliance, an IoT (Internet of things) device, or any of the computing devices described herein, using hardware and/or software (see e.g., FIG. 6).

FIG. 2 is a more detailed block diagram illustrating the Wi-Fi controller 110 of the system 100, according to an embodiment. The components can be implemented in hardware, software, or a combination of both. The Wi-Fi controller 110 include an access point module 210 to register, monitor and manage access points on the network, for instance, when access points power up, power down, reboot, freeze, move from one location to another, respond to probe requests, and have network security threats. A station module 220 can register a station at a first access point and maintain uniform network treatment as the station roams to a second or third access point. The Wi-Fi controller 110 can also force hand-offs for stations driving them to a different access point. Rogue stations can also be tracked.

An RSSI detection module 230 measures signal strength of connected stations, for example, by flight time of data packets. A station can have different RSSI measurements to different access points, and connection decisions can be made based on station uplink station capabilities in combination with RSSI measurements. Even if an RSSI measurement between a station and a particular access point is stronger than others, depending on a weighting algorithm, assignment can be made to a different access point with a weaker RSSI measurement to the station. Other variations consider additional factors such as local airtimes fairness of an access point and network conditions. Finally, the network communication module 240 provides communication protocols, software and hardware for network communication.

Figure 3:
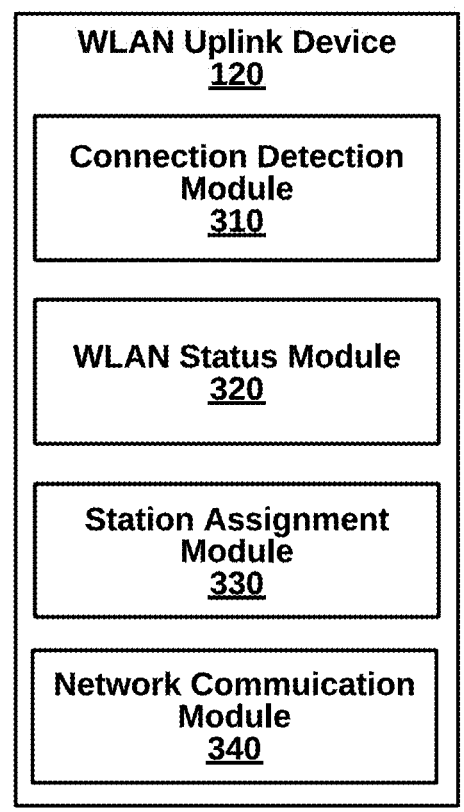
FIG. 3 is a more detailed block diagram illustrating a WLAN uplink device of the system of FIGS. 1A/1B, according to an embodiment.

FIG. 3 is a more detailed block diagram illustrating the Ethernet uplink monitoring device 120 of the system 100 of FIG. 1, respectively, according to one embodiment. The components can be implemented in hardware, software, or a combination of both. The Ethernet uplink monitoring device 120 comprises a connection detection module 310 to initiate assignment algorithms from a new connection or roaming connection. A daemon running on the Wi-Fi controller 110, an access point, or even on a station can send a signal. A WLAN status module 320 tracks Ethernet uplink loads on individual access points as well as the network as a whole. Each access point can have an uplink load value or a general categorization (e.g., low, medium or high). Thresholds can be manually adjusted by a network administrator or automatically by artificial intelligence process that react to changing conditions of the network. A network communication module 340 provides communication protocols, software and hardware for network communication.

A station assignment module 330 analyzes station capabilities and uplink loads to determine allocation of stations. An individual station can be assigned upon connection, or stations can be rearranged based on changing needs and conditions. In some embodiments, bandwidth capabilities are also factored into assignments, such as 160 MHz capability versus 80 MHz or 40 MHz. In further embodiments, spectrum availability is factored into assignments.

The access point manager 220 manages the access points 101A-D and indirectly manages connected stations 102A-D with respect to network access and type of access, in an embodiment. SSIDs (service set identifiers) can be assigned to and unassigned from an access point. Additionally, when stations are handed-off from one access point to another access point, the SSID can follow the station to different access points, for example, as implemented in the virtual port feature by Fortinet, Inc. of Sunnyvale, CA. When stations change access points, the access point manager can keep connection parameters and security consistent. Thus, the access point manager can compel station configurations and behaviors that may not occur naturally, rather than allowing stations to choose access points as they usually do under IEEE 802.11 standards.

II. Methods for Artificially Intelligent Uplink Selection (FIGS. 4-5)

Figure 4:
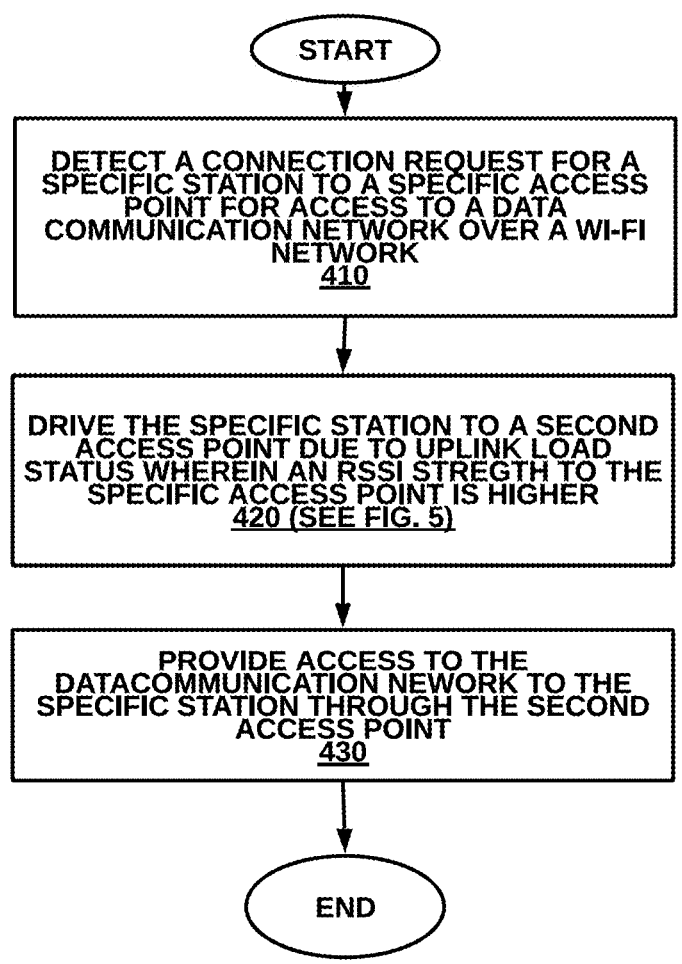
FIG. 4 is a high-level flow diagram illustrating a method for using artificial intelligence to drive stations with 6 GHz and IEEE 802.1AX uplink capability based on an Ethernet uplink load status across access points of a wireless network, according to one embodiment.
Figure 5:
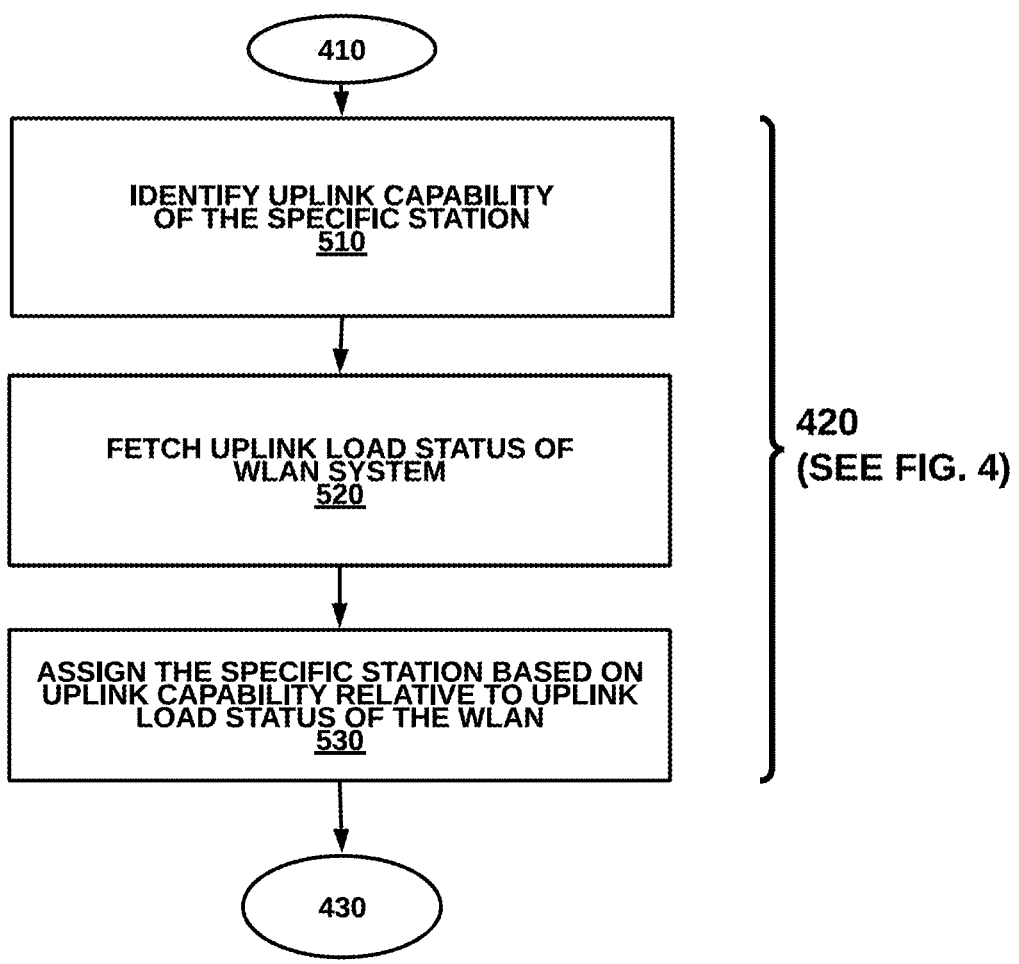
FIG. 5 is a more detailed flow diagram illustrating a step of driving a specific station to a second access point due to uplink load states of the method of FIG. 4, according to an embodiment.

FIG. 4 is a high-level flow diagram illustrating a method for using artificial intelligence to drive stations with 6 GHz uplink capability based on an Ethernet uplink load status across access points of a wireless network, according to one embodiment. The method 400 can be implemented, for example, by the system 100 of FIG. 1. The steps are merely representative groupings of functionality, as there can be more or fewer steps, and the steps can be performed in different orders. Many other variations of the method 400 are possible.

At step 410, a connection request is detected for a specific station to a specific access point for access to a data communication network over a Wi-Fi network. In another embodiment, several access points of the system receive and report the same probe request. Additionally, the probe request can be for an initial connection or, during roaming, a transfer connection. In one example, the specific access point receives the request, along with an RSSI measurement and other characteristics and network measurements, into a message sent upstream to a Wi-Fi controller and/or a WLAN uplink device.

At step 420, the specific station is driven to a second access point due to upload load status of the WLAN system, the specific access point, and/or the second access point. More specifically, in FIG. 5, at step 510, an uplink capability is identified for a specific station (e.g., 6 GHz, 5 GHz and/or 2.4 GHz). At step 520, an Ethernet uplink load status of access points on the WLAN system is fetched. The uplink load status includes uplink loads for the specific access point, the second access point, other access points and/or all connected access points and other network devices (e.g., routers, modems, switches and gateways). The specific station is assigned based on an analysis of uplink loads. The assignment can be made by the Wi-Fi controller or an access point.

Referring again to FIG. 4, at step 430, access is provided to the data communication network through the second access point. In doing so, data uploads are sent from the specific station to the access point, within parameters set by the system. In some embodiments, additional load balancing techniques between stations connecting to the same access point are implemented.

III. Generic Computing Device for Uplink Techniques (FIG. 6)

FIG. 6 is a block diagram illustrating an example computing device 600 for use in the system 100 of FIG. 1, according to one embodiment. The computing device 600 is implementable for each of the components of the system 100. The computing device 600 can be a mobile computing device, a laptop device, a smartphone, a tablet device, a phablet device, a video game console, a personal computing device, a stationary computing device, a server blade, an Internet appliance, a virtual computing device, a distributed computing device, a cloud-based computing device, or any appropriate processor-driven device.

The computing device 600, of the present embodiment, includes a memory 610, a processor 620, a storage drive 630, and an I/O port 640. Each of the components is coupled for electronic communication via a bus 699. Communication can be digital and/or analog and use any suitable protocol.

The memory 610 further comprises network applications 612 and an operating system 614. The network applications 612 can include a web browser, a mobile application, an application that uses networking, a remote application executing locally, a network protocol application, a network management application, a network routing application, or the like.

The operating system 614 can be one of the Microsoft Windows® family of operating systems (e.g., Windows 96, 98, Me, Windows NT, Windows 2000, Windows XP, Windows XP x64 Edition, Windows Vista, Windows CE, Windows Mobile, Windows 6 or Windows 8), Linux, HP-UX, UNIX, Sun OS, Solaris, Mac OS X, Alpha OS, AIX, IRIX32, IRIX64, or Android. Other operating systems may be used. Microsoft Windows is a trademark of Microsoft Corporation.

The processor 620 can be a network processor (e.g., optimized for IEEE 802.11, IEEE 802.11AC or IEEE 802.11AX), a general purpose processor, an application-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the storage drive 630.

The storage drive 630 can be any non-volatile type of storage such as a magnetic disc, EEPROM (electronically erasable programmable read-only memory), Flash, or the like. The storage drive 630 stores code and data for applications.

The I/O port 640 further comprises a user interface 642 and a network interface 644. The user interface 642 can output to a display device and receive input from, for example, a keyboard. The network interface 644 (e.g. RF antennae) connects to a medium such as Ethernet or Wi-Fi for data input and output.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent application with data input and data display modules. Alternatively, the computer software products may be classes that are instantiated as distributed objects. The computer software products may also be component software such as Java Beans (from Sun Microsystems) or Enterprise Java Beans (EJB from Sun Microsystems). Some embodiments can be implemented with artificial intelligence.

Furthermore, the computer that is running the previously mentioned computer software may be connected to a network and may interface with other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.11ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

We claim:

1. A computer-implemented method, in a Wi-Fi controller coupled to a plurality of access points on a data communication network, for artificially intelligent Ethernet uplink monitoring based on 6 GHz uplink availability of a Wi-Fi network and based on 6 GHz uplink capability of a plurality of stations connected for uplinking to the plurality of access points, the method comprising the steps of:

detecting a probe to a specific access point of the plurality of access points from a specific station requesting access to the data communication network over the Wi-Fi network;

identifying one or more capabilities of the specific station, wherein the specific station has an uplink capability of 6 GHz according to IEEE 802.11AX;

fetching an Ethernet uplink load status of a WLAN system from a monitoring module to an assignment module, wherein the Ethernet uplink load status comprises an uplink load value for each of the plurality of access points;

identifying an RSSI (Radio Signal Strength Indicator) strength of the specific station relative to the specific access point and a second access point of the plurality of access points; and assigning the specific station to the second access point based balancing an Ethernet uplink load status of the specific access point relative to the uplink load status of the WLAN system, wherein the RSSI strength of the specific station relative to the specific access point is higher than the RSSI strength of the specific station relative to the second access point.

2. The method of claim 1, wherein the assigning comprises:

determining that that a second access point has an Ethernet uplink load value above a specific threshold and determining that a first access point has an uplink load below the specific threshold.

3. The method of claim 1, wherein a Ethernet uplink load value of the specific access point and a second access point comprises an amount of uplink bandwidth consumed out of a supported uplink capacity of bandwidth.

4. The method of claim 1, wherein the identifying step comprises:

identifying one or more capabilities of the specific station, wherein the specific station has an uplink capability of 6 GHz, 5 GHz and 2.4 GHz.

5. The method of claim 4, wherein the assigning step comprises:

determining that the specific station operates at 2.4 GHz; and assigning the specific station based on a highest RSSI strength regardless of any specific Ethernet uplink value.

6. The method of claim 1, further comprising:
detecting that the specific station has been downgraded from 6 GHz capability based on the specific access point exceeding a specific threshold value; and
responsive to the detection, driving the specific station from the specific access point to a different of the plurality of access points.

7. The method of claim 1, further comprising:
driving at least one of the stations from the specific access point due to the specific Ethernet uplink value exceeding a threshold value, including deauthenticating at least one station of the plurality of stations with respect to the specific access point, and authenticating the at least one station with a different of the plurality of stations based on RSSI values of the at least one station relative to the plurality of stations.

8. The method of claim 1, further comprising:
determining that the Ethernet uplink load status of the plurality of access points across the WLAN system exceeds a predetermined system threshold; and
responsive to exceeding the predetermine system threshold, notifying a system administrator for adjustment of the specific threshold.

9. The method of claim 1, wherein an Ethernet uplink load value of the specific access point and the second access point is categorized as one of low, medium and high.

10. The method of claim 1, wherein the detecting step comprises:
detecting the probe from the specific station, wherein the specific station is roaming from another of the plurality of the access points.

11. The method of claim 1, wherein a max RSSI for the specific station is −30 dbm and a min RSSI for the specific station is −50 dbm.

12. A non-transitory computer-readable media storing source code that, when executed by a processor, performs a computer-implemented method, in a Wi-Fi controller coupled to a plurality of access points on a data communication network, for artificially intelligent Ethernet uplink monitoring based on 6 GHz uplink availability of a Wi-Fi network and based on 6 GHz uplink capability of a plurality of stations connected for uplinking to the plurality of access points, the method comprising the steps of:
detecting a probe to one of the plurality of access points from a specific station;
identifying one or more capabilities of the specific station, wherein the specific station is capable of 6 GHz according to IEEE 802.11AX;
fetching an Ethernet uplink load status of a WLAN system from a monitoring module to an assignment module, wherein the uplink load status comprises an uplink load value for each of the plurality of access points;
identifying an RSSI (Radio Signal Strength Indicator) strength of the specific station relative to the specific access point and a second access point of the plurality of access points; and
assigning the specific station to a specific access point based balancing an uplink load status of the specific access point relative to the uplink load status of the WLAN system, wherein the RSSI strength of the specific station relative to the specific access point is less than the RSSI strength of the specific station relative to the second access point.

13. A Wi-Fi controller coupled to a plurality of access points on a data communication network, for artificially intelligent Ethernet uplink monitoring based on 6 GHz uplink availability of a Wi-Fi network and based on 6 GHz uplink capability of a plurality of stations connected for uplinking to the plurality of access points, the Wi-Fi controller comprising:
a processor;
a network interface communicatively coupled to the processor and communicatively coupled to the data communication network; and
a memory communicatively coupled to the processor and storing computer code, comprising:
detecting a probe to one of the plurality of access points from a specific station;
identifying one or more capabilities of the specific station, wherein the specific station is capable of 6 GHz according to IEEE 802.11AX;
fetching an Ethernet uplink load status of WLAN system from a monitoring module to an assignment module, wherein the uplink load status comprises an uplink load value for each of the plurality of access points;
identifying an RSSI (Radio Signal Strength Indicator) strength of the specific station relative to a specific access point and a second access point of the plurality of access points; and
assigning the specific station to a specific access point based balancing an uplink load status of the specific access point relative to the uplink load status of a WLAN system, wherein the RSSI strength of the specific station relative to the specific access point is less than the RSSI strength of the specific station relative to the second access point.

* * * * *